United States Patent [19]

Straus et al.

[11] Patent Number: 5,089,320
[45] Date of Patent: Feb. 18, 1992

[54] RESEALABLE PACKAGING MATERIAL

[75] Inventors: Steven J. Straus, Concord; Edward J. Zuscik, Oakland; William B. Bower, Palo Alto; Apostol Yanidis, Berkeley, all of Calif.

[73] Assignee: James River II, Inc., Cincinnati, Ohio

[21] Appl. No.: 603,760

[22] PCT Filed: Jan. 5, 1990

[86] PCT No.: PCT/US90/00101
§ 371 Date: Nov. 9, 1990
§ 102(e) Date: Nov. 9, 1990

Related U.S. Application Data

[63] Continuation-in-part of Ser. No. 295,077, Jan. 9, 1989, abandoned.

[51] Int. Cl.$^5$ ............................................. B32B 19/00
[52] U.S. Cl. ................................... 428/216; 428/35.8; 428/349; 428/483; 428/517; 428/521
[58] Field of Search .................... 428/349, 517, 35.8, 428/483, 521

[56] References Cited

U.S. PATENT DOCUMENTS

| | | | |
|---|---|---|---|
| 3,655,503 | 4/1972 | Stanley | 229/51 WB |
| 4,370,369 | 1/1983 | Bonis | 428/349 |
| 4,438,850 | 3/1984 | Kahn | 229/3.5 R |
| 4,543,139 | 9/1985 | Freedman | 428/354 |
| 4,615,926 | 10/1986 | Hsu et al. | 428/349 |
| 4,673,601 | 6/1987 | Lamping et al. | 428/36.6 |

Primary Examiner—Edith L. Buffalow
Attorney, Agent, or Firm—Stanley M. Teigland

[57] ABSTRACT

A machinable flexible packaging material capable of forming a seal that is reclosable at ambient temperature is made by applying a tacky adhesive and a thin skin layer onto a substrate, such as polyester film. Being thin, the skin layer fractures when the seal is opened, thereby allowing the adhesive to form a resealable interface at the seal area. However, since the adhesive is encapsulated in the material initially, the material may be used like other packaging materials in form, fill and seal machines.

19 Claims, No Drawings

RESEALABLE PACKAGING MATERIAL

This is a continuation-in-part of application Ser. No. 07/295077 filed Jan. 9, 1989, now abandoned.

Flexible packaging materials comprising layers of thermoplastic polymers are used to package a variety of products, particularly food. For example, cereals, potato chips and other snack foods are packaged in such materials. The packages are formed in packaging machines in which the material is sealed to itself by heated sealing jaws. However, when a package is opened by pulling apart one of the heat seals, normally at the top of the package, the heat seal is not reasealable without the application of heat as well as pressure. This invention provides a flexible packaging material that is resealable by the application of pressure alone at the area of a seal formed by a packaging machine.

The material of this invention comprises a substrate layer, a layer of tacky adhesive adjacent the substrate layer, and a skin layer covering the layer of tacky adhesive. When a seal formed by sealing the packaging material to itself is pulled apart, the tacky adhesive is exposed at the surface of the seal area, thereby permitting the material to be resealed to itself at the area of the seal by the application of manual pressure alone to reclose the package.

The substrate layer may comprise any material that is conventionally used for flexible packaging applications, such as plastic film, metal foil, paper or a combination thereof. Plastic film substrates may be single layer or multilayer and may be oriented or unoriented. The film can be polyamide, polyester, or olefin polymer or copolymer. Suitable substrates include poly(ethylene terephthalate) film, paper, oriented polypropylene film, and nonwoven materials.

As used herein, the term "tacky adhesive" refers to an adhesive that, in the practice of this invention, forms a resealable bond by the application of manual pressure alone at room temperature. The reseal strength is preferably between about 0.5 and 4 pounds per inch (0.1 and 0.7 kg/cm), more preferably between about one and two pounds per inch (0.18 and 0.36 kg/cm). Such adhesives may include cold seals and tacky lacquers. Cold seals are formed from aqueous latex emulsions of an elastomer. The tacky adhesive is preferably a pressure sensitive adhesive, which is a blend of an elastomer and a tackifier. The pressure sensitive adhesive preferably comprises from about 40 to 80 percent of a thermoplastic elastomer, 20 to 60 percent of a tackifier, and up to about 15 percent of other components, such as a fragrance and conventional additives, such as an antioxidant and an oil.

When the adhesive layer in the packaging material contains a fragrance, the fragrance is not appreciably noticeable until the material is formed into a package and the package is opened because the fragrance is essentially encapsulated in the packaging material. When the package is opened, the fragrance is liberated, thereby enhancing the appeal of the product in the package. Best results are obtained using an oil-based fragrance that is absorbed by the elastomer component of the adhesive.

Particularly suitable elastomers include styrene copolymers, such as styrene-butadiene copolymers sold under the trademark Stereon by Firestone and styrene-isoprene copolymers sold under the trademark Kraton by Shell Chemical Company. Other suitable elastomers include polyurethane and ethylene-vinyl acetate copolymers having a vinyl acetate content of about 18 percent or higher.

The tackifier may be any tackifier conventionally used with elastomers to form pressure sensitive adhesives. Suitable tackifiers include terpene resins, such as resins sold under the trademark Zonatac by Arizona Chemical Company, and petroleum hydrocarbon resins, such as resins sold under the trademark Escorez by Exxon Chemical Company.

The pressure sensitive adhesive is preferably coextrudable. The coextrudability of the pressure sensitive adhesive may be enhanced by utilizing a thermoplastic elastomer having a low melt index and by increasing the proportion of the elastomer in the adhesive. The melt index of the adhesive is preferably less than 30, more preferably less than 10, for coextrusion with conventional polyolefins.

The pressure sensitive adhesive, or other tacky adhesive, may be applied to the substrate by methods other than extrusion, such as adhesive lamination, rotogravure, flexographic or silk screen printing, Meyer rod, spray coating, charged particle coating, or vacuum deposition. The adhesive may be applied as 100 percent solids or by using water or a solvent as a vehicle.

Since the tacky adhesive is required only in the area where the package is to be opened, the adhesive may be coated onto the substrate in register only where it is required. The skin layer may be similarly applied in register over the adhesive alone, such as by printing the adhesive layer and the skin layer onto the substrate sequentially using a central impression press. However, the skin layer may be applied to other surface areas as well, including the entire surface of the packaging material.

The tacky adhesive may also be applied to the substrate by transferring it from a carrying medium. This technique is commonly used to transfer a thin layer of metal, such as that formed by vapor deposition, from one substrate to another in the manufacture of metallized packaging materials. The skin layer may also be transferred with the adhesive by this technique. The carrying medium is preferably paper coated with a silicone release agent. The paper substrate may be recycled and may be an endless belt in a continuous process. If the paper bearing the adhesive layer is rolled up, it is preferably coated with the release agent on both sides to prevent blocking.

The thickness of the layer of tacky adhesive is preferably between about 0.1 and 2.0 mil (2.5 and 51 microns), more preferably between about 0.3 and 0.7 mil (7.6 and 18 microns).

The skin layer performs two critical functions. First, it produces a coefficient of friction on the surface of the packaging material such that the material is machinable in a conventional packaging machine. Second, the skin layer becomes broken so that when the seal is pulled apart, the tacky adhesive is exposed at the surface of the seal. There are two mechanisms by which this occurs. In one mechanism (First Mechanism), the skin layer is disrupted by the shearing action of the sealing jaws in the packaging machine such that the tacky adhesive becomes present at the interface where the material is sealed to itself. The skin layer is preferably disrupted over most of the area of the seal. By this mechanism, it is possible to produce the initial seal from the tacky adhesive alone, thereby obviating the need to apply heat to the sealing jaws. In the other mechanism (Second Mechanism), the skin layer is heat sealed to itself, preferably using flat sealing jaws, and remains substantially intact until it ruptures through to the adhesive layer when force is initially applied to pull the heat seal apart. The skin layer then delaminates from the substrate layer when additional force is applied until the end of the seal is reached. The delamination may occur between the skin layer and the adhesive layer, between the adhesive layer and the substrate layer, or, preferably, in a plane lying in the adhesive layer so the adhesive is present on both surfaces of the seal area after the seal has been pulled apart. The latter type of delamination is promoted by heating both sealing jaws when the heat seal is formed.

When the Second Mechanism is employed, the tacky adhesive is preferably an extrudable pressure sensitive adhesive which is coextruded with the skin layer, either with the substrate layer or onto the substrate layer. When the substrate layer is coextruded with the skin layer and the adhesive layer, either blown film coextrusion or cast film coextrusion may be employed. The extrudate may contain multiple layers of the pressure sensitive adhesive.

The skin layer may be a layer of a thermoplastic film-forming polymer which is conventionally used as a heat seal layer in packaging materials. The polymer preferably has a tensile strength such that at the desired thickness of the skin layer the heat seal is easy to open, preferably by a force between about 0.4 and 0.9 kg/cm. The polymer also preferably has a low elongation at break, preferably less than 400 percent. The polymer is preferably a copolymer of ethylene and an ethylenically unsaturated comonomer selected from the group consisting of carboxylic acids and esters, salts and anhydrides thereof. Examples of such comonomers include acrylic acid, methacrylic acid, methyl acrylate, ethyl acrylate, methyl methacrylate, vinyl acetate, and maleic anhydride. Such copolymers are well known commercially available polymers commonly used to form heat seal layers in flexible packaging materials. Other polymers, such as polyolefins, may be blended with the copolymer in a minor amount. The copolymer is preferably an ionomer. The term ionomer refers to a film-forming copolymer of an olefin and an ethylenically unsaturated monocarboxylic acid wherein at least 10% of the carboxylic acid groups are neutralized by a metal ion, preferably zinc. The olefin has the formula $RCH=CH_2$ where R is hydrogen or an alkyl group having up to 8 carbon atoms. The olefin is preferably ethylene. The carboxylic acid is preferably acrylic acid, methacrylic acid, or methylmethacrylic acid. The proportion of olefin units in the ionomer is at least 50, preferably at least 80, mole percent. Suitable ionomers are described in U.S. Pat. No. 3,355,319 and are available commercially under the trademark Surlyn.

The skin layer is preferably relatively thin, preferably thinner than the heat seal layer of conventional packaging materials so the layer fractures when the sealing jaws are applied or when the seal is pulled apart. The thickness of the skin layer is preferably between about 0.05 and 0.5 mil (1.3 and 13 microns), more preferably between about 0.075 and 0.2 mil (1.9 and 5 microns).

When the First Mechanism is employed, the skin layer may be any substance that produces the desired coefficient of friction and that is sufficiently disrupted by the sealing jaws that the adhesive becomes present at the seal interface. The substance may even be finely divided solid particulate matter (dust), such as talc or starch particles. The particles may be applied to the adhesive layer in accordance with conventional methods, such as by using Oxydry (trademark) apparatus.

The skin layer and the layer of pressure sensitive adhesive may be coextruded together generally in accordance with conventional coextrusion coating methods to form the packaging material of the invention. The components of the pressure sensitive adhesive are preferably maintained under an inert atmosphere, such as nitrogen, to minimize oxidation at the extrusion temperature, which produces degradation and odor.

The packaging material may be sealed in accordance with methods typically used for sealing flexible packaging materials in packaging machines. When the First Mechanism is employed, the packaging material is preferably sealed by means of sealing jaws that impart shear to the skin layer, such as described in U.S. Pat. No. 4,582,555. The shear promotes fracture of the skin layer and exposure of the tacky adhesive when the seal is opened. When the First Mechanism is employed, the temperature of the sealing jaws is preferably less than the melting point of the skin layer. In some embodiments, the jaws may be at ambient temperature so the material may effectively be "cold sealed" rather than heat sealed. When the Second Mechanism is employed, the skin layer is heat sealed to itself at a conventional temperature of about 230° F. (110° C.). In either mechanism, the seal has a bond strength that is sufficient to ensure the package does not open during normal handling. This bond strength is preferably at least about two pounds per inch (0.4 kg/cm). However, the seal is also preferably easy to open by being pulled apart manually, so the bond strength is preferably less than about five pounds per inch (0.9 kg/cm).

Until the skin layer is fractured, the coefficient of friction of the skin layer is determined by the substance forming the skin layer. Accordingly, the material of this invention may be used in conventional packaging machines, such as form, fill and seal machines, in the same manner as conventional flexible packaging materials. A material having a tack adhesive on its surface could not be used in such machines, of course, because of the high coefficient of friction of the adhesive. The ability of a packaging material to be used in packaging machines is referred to in the art as machinability. The material of this invention has good machinability. In preferred embodiments, each surface of the material has a coefficient of friction against stainless steel which is within the preferred range for machinability, which is from about 0.1 to 0.5.

EXAMPLE 1

A laminate was formed by coextruding a skin layer and a pressure sensitive adhesive onto a substrate. The substrate was a poly(ethylene terephthalate) film having a thickness of 12.2 microns (Dupont Mylar). The skin layer, which was extruded at 218° C., consisted of polystyrene (Dow Styron 625). The pressure sensitive adhesive, which was extruded at about 163° C., consisted of 68 percent styrene-isoprene-styrene block copolymer (Shell Kraton D-1107), 30 percent aliphatic petroleum hydrocarbon resin (Exxon Escorez 1310), and 2 percent phenolic antioxidant (Ciba-Geigy Irganox 1010). The hydrocarbon resin was injected into the barrel of the extruder. The thickness of the polystyrene layer was about 0.1 mil (2.5 microns) and the thickness of the layer of pressure sensitive adhesive was about 0.5 mil (12.7 microns). The laminate was heat sealed to itself using the heat seal jaws described in U.S. Pat. No. 4,582,555 by applying a pressure of 80 psi (5.6 kg/cm) for two seconds at a temperature of 110° F. A force of 3.3 pounds per inch width (0.59 kg/cm) was required to open the heat seal. The opened heat seal was then resealed, opened and resealed again twenty times by applying a pressure of 14 psi (0.99 kg/sq.cm) at room temperature for less than 0.1 second. The average reseal strength was 1.03 pounds per inch width (184 grams/cm).

This example illustrates that the packaging material of this invention is especially suitable for packaging cereals and snack foods in packages that may be easily resealed after each intermittent use.

EXAMPLE 2

A laminate was formed by applying a coating of molten pressure sensitive adhesive onto a substrate, cooling the adhesive, and then applying a coating of polyvinylidene chloride (PVDC) emulsion on top of the adhesive. The coatings were applied using a Meyer rod. The substrate was poly(ethylene terephthalate) film having a thickness of one mil (25 microns). The pressure sensitive adhesive was heated to about 150° C. and applied at a coating weight of about 14 pounds per ream (23 grams per square meter). The pressure sensitive adhesive, which is commercially available from Findley Adhesives, has a viscosity at 150° C. of about 42,000 centipoise. The PVDC was applied at a coating weight of about 4 pounds per ream (7 grams per square meter) and dried at about 93° C. The laminate was then sealed to itself using sealing jaws that impart high shear. The jaws were heated to 71° C. and applied at a pressure of 80 psi (5.6 kg/sq.cm). A force of 3.2 pounds per inch (0.57 kg/cm) was required to open the seal. The opened seal was then resealed, opened and resealed 20 times by applying a pressure of 14 psi (0.99 kg/sq.cm) at room temperature for less than one second. The average reseal strength was 0.53 pounds per inch (95 grams per cm).

The Example illustrates the preparation of packaging material of this invention employing the First Mechanism. The material may be used to package cereals and snack foods in packages that may be easily resealed after each intermittent use.

EXAMPLE 3

A laminate was formed by coextruding a skin layer and a layer of pressure sensitive adhesive onto a film of high density polyethylene having a thickness of two mils (51 microns). The skin layer, which was extruded at 230° C., consisted of an ionomer available commercially from Dupont. The pressure sensitive adhesive, which was extruded at 196° C., is available commercially from Findley Adhesives. The adhesive has a viscosity of over one million centipoises at 177° C. The basis weight of the adhesive was 5 pounds per ream (8 grams per square meter). The basis weight of the skin layer was 4 pounds per ream (7 grams per square meter). The laminate was then heat sealed to itself using flat sealing jaws applied at a pressure of 40 psi (2.8 kg/cm) for one second, with one jaw being at room temperature and the other jaw at 116° C. A force of 2.4 pounds per inch (0.43 kg/cm) was required to open the heat seal. The opened heat seal was then resealed, opened and resealed again 20 times by applying a pressure of 14 psi (0.99 kg/sq.cm) at room temperature for less than one second. The average reseal strength was 1.03 pounds per inch (184 grams per cm).

This Example illustrates the preparation of packaging material of this invention employing the Second Mechanism. The material may be used to package cereals and snack foods in packages that may be easily resealed after each intermittent use.

We claim:

1. A flexible packaging material comprising a substrate layer, a layer of tacky adhesive adjacent the substrate layer, and a skin layer covering the layer of tacky adhesive, the skin layer having a thickness between about 0.05 and 0.5 mil, each surface of the packaging material having a coefficient of friction such that the material is machinable in a packaging machine, the material being capable of being sealed to itself by the sealing jaws of the packaging machine to form a package having a seal which has an initial bond strength such that the package remains closed during normal handling but which can be readily pulled apart manually to open the package, the skin layer being fractured when the seal is pulled apart such that the tacky adhesive is exposed at the surface of the seal area, whereby the packaging material may be resealed to itself at the area of the seal by the application of manual pressure alone to reclose the package.

2. The packaging material of claim 1 wherein the coefficient of friction to stainless steel is between about 0.1 and 0.5.

3. The packaging material of claim 1 wherein the tacky adhesive contains a fragrance.

4. The packaging material of claim 1 wherein the tacky adhesive is a pressure sensitive adhesive.

5. The packaging material of claim 4 wherein the skin layer and the layer of pressure sensitive adhesive are coextruded together either with the substrate layer or onto the substrate layer, and the skin layer is fractured by rupturing through to the adhesive layer and then delaminating from the substrate layer when the seal is pulled apart, thereby exposing the pressure sensitive adhesive at the seal area.

6. The packaging material of claim 5 wherein the pressure sensitive adhesive comprises from about 40 to 80 percent of a thermoplastic elastomer and from about 20 to 60 percent of a tackifier.

7. The packaging material of claim 5 wherein the skin layer is a layer of a thermoplastic film-forming polymer capable of forming a heat seal when the jaws have a temperature of 230° F. (110° C.).

8. The packaging material of claim 7 wherein the skin layer comprises an ionomer.

9. The packaging material of claim 7 wherein the heat seal has an initial bond strength between about two and five pounds per square inch (0.4 and 0.9 kg/cm).

10. The packaging material of claim 9 wherein the strength of the resealable bond formed by the pressure sensitive adhesive is between about 0.5 and 4 pounds per inch (0.1 and 0.7 kg/cm).

11. The packaging material of claim 1 wherein the thickness of the layer of pressure sensitive adhesive is between about 0.1 and 2.0 mil (2.5 and 51 microns).

12. The packaging material of claim 1 wherein the skin layer is fractured by the sealing jaws such that the jaws disrupt the skin layer such that the tacky adhesive becomes present at the interface where the material is sealed to itself.

13. The packaging material of claim 12 wherein the temperature of the sealing jaws is less than the melting point of the substance forming the skin layer.

14. The packaging material of claim 12 wherein the seal has an initial bond strength between about two and five pounds per inch (0.4 and 0.9 kg/cm).

15. The packaging material of claim 14 wherein the strength of the resealable bond formed by the tacky adhesive is between about 0.5 and 4 pounds per inch (0.1 and 0.7 kg/cm).

16. The packaging material of claim 12 wherein the skin layer consists of finely divided particulate matter.

17. The packaging material of claim 16 wherein the particulate matter is talc or starch particles.

18. A method of forming the packaging material of claim 12 comprising transferring the layer of adhesive to the substrate from a carrying medium.

19. The method of claim 17 wherein the skin layer is transferred to the substrate with the adhesive and the carrying medium is paper coated with a silicone release agent.

* * * * *